(12) United States Patent
Hoffmann et al.

(10) Patent No.: US 7,439,305 B2
(45) Date of Patent: Oct. 21, 2008

(54) HOT-MELT ADHESIVE

(75) Inventors: Gunter Hoffmann, Bopfingen (DE); Ralf Grauel, Hilden (DE); Richard Scholta, Cologne (DE); Thomas Moeller, Duesseldorf (DE); Ralf Eberhardt, Aalen (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 11/764,483

(22) Filed: Jun. 18, 2007

(65) Prior Publication Data

US 2007/0282072 A1 Dec. 6, 2007

Related U.S. Application Data

(63) Continuation of application No. PCT/EP2005/013760, filed on Dec. 21, 2005.

(30) Foreign Application Priority Data

Dec. 22, 2004 (DE) .................... 10 2004 063 021
Feb. 19, 2005 (DE) .................... 10 2005 007 770

(51) Int. Cl.
*C08L 23/00* (2006.01)
*C08L 23/04* (2006.01)
*C08G 18/42* (2006.01)
*C08K 5/00* (2006.01)

(52) U.S. Cl. .................. 525/191; 525/240; 525/241
(58) Field of Classification Search ................ 525/191, 525/240, 241; 524/500, 515
See application file for complete search history.

(56) References Cited

U.S. PATENT DOCUMENTS

| 4,762,878 A | 8/1988 | Takeda et al. |
| 4,952,639 A | 8/1990 | Minomiya et al. |
| 5,530,054 A | 6/1996 | Tse et al. |
| 5,670,566 A | 9/1997 | Liedermooy et al. |
| 5,985,074 A | 11/1999 | Heemann et al. |
| 6,107,430 A | 8/2000 | Dubois et al. |
| 6,143,846 A | 11/2000 | Herrmann et al. |
| 6,872,279 B1 | 3/2005 | Kolowrot et al. |
| 2007/0036945 A1 | 2/2007 | Balakoff et al. |

FOREIGN PATENT DOCUMENTS

| DE | 195 22 568 A1 | 1/1997 |
| DE | 696 02 035 T2 | 12/1999 |
| DE | 199 44 225 A1 | 3/2000 |
| EP | 0 890 584 B1 | 5/2002 |
| WO | WO 96/40830 A1 | 12/1996 |
| WO | WO 00/00565 A1 | 1/2000 |

*Primary Examiner*—Nathan M Nutter
(74) *Attorney, Agent, or Firm*—Woodwock Washburn LLP

(57) ABSTRACT

Hot-melt adhesives containing at least one aromatic modified polyethylene and/or polypropylene (co)polymer, a further ethylene or propylene/C4 to C20 alpha-olefin copolymer, and at least one tackifying resin are useful for the adhesive bonding of package and paperboard products.

16 Claims, No Drawings

HOT-MELT ADHESIVE

CROSS-REFERENCE TO RELATED APPLICATIONS

This application is a continuation under 35 USC Sections 365(c) and 120 of International Application No. PCT/EP2005/013760, filed 21 Dec. 2005 and published 6 Jul. 2006 as WO 2006/069687, which claims priority from German Application No. 102004063021.6, filed 22 Dec. 2004, and German Application No. 102005007770.6, filed 19 Feb. 2005, each of which is incorporated herein by reference in its entirety.

FIELD OF THE INVENTION

The invention relates to a hot-melt adhesive based on at least one aromatically modified polyethylene and/or polypropylene (co)polymer, one further ethylene or propylene/$C_4$ to $C_{20}$ α-olefin copolymer, at least one tackifying resin, and waxes and additives. The invention also relates to the manufacture of this hot-melt adhesive and to its use.

DISCUSSION OF THE RELATED ART

"Hot-melt adhesives" are understood as adhesives that are applied as a melt onto the parts to be adhesively bonded, and cure as they cool and solidify. Hot-melt adhesives are widely used industrially; in the packaging and paper industry, for example, they are used to seal and close cartons or for the lamination of multi-layer papers. The requirements that must be met by such hot-melt adhesives for the various applications are numerous:

For example, the hot-melt adhesives must possess a moderate to long open time (defined as the time span between adhesive application and assembly of the parts to be joined), but must cure quickly enough after immobilization of the parts being joined in order to ensure an adhesive bond of appropriate quality, in particular on fast-running packaging machines. In addition to the curing rate, the viscosity is an important criterion for selecting a hot-melt adhesive. For automatic processing, especially for uniform hot-melt adhesive application, the viscosity should be sufficiently low at a corresponding application temperature. For adhesive bonding of packages in the frozen-goods sector, a corresponding low-temperature flexibility should exist. In other words, at low temperature the adhesive bond should possess high strength and the adhesive should not become brittle or break.

On the other hand, foods or beverages are often packaged by warm or hot filling, so that what is required here is a correspondingly high hot strength for the adhesive, which as a rule is associated with high viscosity. "Sufficiently good heat resistance" is to be understood to mean that the cured adhesive does not immediately soften when acted upon by elevated temperature, with the result that the adhesive bond loosens and/or the bonded parts shift with respect to one another. It is further necessary, in particular for the food industry, to provide hot-melt adhesives that are maximally odor-free or low-odor.

Hot-melt adhesives based on polyethylene or polypropylene homo- or copolymers are known. DE 696 02 035 T2 describes, for example, a packaging hot-melt adhesive that contains as constituents at least one ethylene/n-butylacrylate copolymer, a colophon ester tack resin, a microcrystalline wax or paraffin wax, and a polymeric additive that can also be an ethylene or propylene homo- or copolymer.

U.S. Pat. No. 6,107,430 describes a hot-melt adhesive that contains at least one linear homogeneous ethylene/$C_3$-$C_{20}$ α-olefin copolymer that has a density from 0.850 g/cm³ to 0.895 g/cm³. The copolymer is intended to have a viscosity from 2000 mPas to 18,000 mPas. A further modification of the copolymer is not described. The hot-melt adhesive can also contain wax; one embodiment uses wax that is manufactured on the basis of ethylene, with further comonomers, by metallocene catalysis.

Also known is U.S. Pat. No. 5,530,054, in which a hot-melt adhesive is described that is made up substantially of a copolymer based on ethylene and $C_4$ to $C_{20}$ α-olefins and contains a hydrocarbon tack resin, the latter having a softening point between 70 and 130° C. The ethylene/α-olefin copolymers are manufactured by metallocene catalysis and are contained in proportions from 30-70 wt % in the hot-melt adhesive. A modification of these copolymers is not described.

EP 0890584 describes polypropylene homo- and copolymers that are also suitable for use in hot-melt adhesives. These polymers are manufactured using metallocene catalysts, and exhibit a melt viscosity of <90 mPas at 170° C. $C_2$ to $C_{18}$ olefins or diolefins are described as comonomers.

WO 00/00565 describes hot melt adhesives that contain 5 to 50 wt % of a substantially linear homogeneous ethylene/α-olefin copolymer having a density from 0.850 to 0.965 g/cm³, as well as further copolymers and tack resins. The molecular weight of the ethylene/α-olefin copolymers is up to 100,000 g/mol. The viscosity of the ethylene/α-olefin copolymers is between 2000 and 200,000 mPas at 350° F. These are once again polymers manufactured by metallocene catalysis, which exhibit a narrow molecular weight distribution.

DE 199 44 225 likewise describes hot-melt adhesives that contain 30 to 70 wt % of a substantially amorphous poly-α-olefin copolymer, the latter being intended to have a density <0.90 g/cm³ and a melt viscosity between 1000 and 20,000 mPas. Polyolefins that can be manufactured by radical breakdown of poly-α-olefins are described in particular. Also described, in order to improve compatibility, is modification of these polymers with unsaturated carboxylic acids or their anhydrides.

Hot-melt adhesives of the existing art have been found to be disadvantageous in that simultaneously required properties such as rapid curing combined with the longest possible open time, and low application viscosity together with good heat resistance for the adhesives, are difficult to combine with one another. In addition, the problem of good adhesion on different substrates has often not been solved satisfactorily over the entire range. A further problem is that of ensuring compatibility of the individual components of the adhesive.

BRIEF SUMMARY OF THE INVENTION

The object of the present invention is accordingly to make available a hot-melt adhesive having low application viscosity and good adhesion to the substrate, which adhesive at the same time exhibits good heat resistance capability and a long open time for processing, in combination with rapid curing. A further intention is to achieve an improvement in the compatibility of the adhesive components.

The object is achieved by making available a hot-melt adhesive containing 1 to 40 wt % of at least one homo- or copolymer that is based on ethylene or propylene and has been modified with aromatic constituents; 5 to 80 wt % of at least one further olefin copolymer, not aromatically modified, that is based on ethylene and/or propylene and $C_4$ to $C_{20}$ α-olefins and is obtainable by metallocene-catalyzed polymerization; 0-40 wt % of further polymers, in particular block copolymers; 5 to 60 wt % of at least one tackifying resin; and 0 to 40 wt % additives.

A further subject of the invention is the use of such hot-melt adhesives in packages that can be stored and opened at low temperature.

DETAILED DISCUSSION OF CERTAIN EMBODIMENTS OF THE INVENTION

The hot-melt adhesive according to the present invention contains at least one homo- or copolymer based on ethylene and/or propylene as well as optionally further copolymerizable monomers, which polymer has been modified with aromatic constituents. The monomers that can be used in addition to ethylene or propylene are the known olefinically unsaturated monomers that are copolymerizable with ethylene or propylene. These are, in particular, linear or branched $C_4$ to $C_{20}$ α-olefins such as butene, hexene, methylpentene, octene; cyclically unsaturated compounds such as norbonene or norbonadiene; symmetrically or asymmetrically substituted ethylene derivatives, $C_1$ to $C_{12}$ alkyl radicals being suitable as substituents; and, if applicable, unsaturated carboxylic acids or carboxylic acid anhydrides. The polymers can be homopolymers, copolymers, and/or terpolymers, which can also contain further polymers. Homo/copolymers will be understood hereinafter also to mean those polymers made up of more than two monomers, in which context the quantity of the comonomers is preferably to be less than 20%. These homo/copolymers are usually statistically polymerized and are not block copolymers, In a particularly preferred embodiment, (co)polymers manufactured by metallocene catalysis are used as the starting basis for modification. These (co)polymers are notable for the fact that they exhibit a narrow molecular weight distribution, and particularly preferably the comonomers are distributed homogeneously over the molecule chain.

It is necessary, according to the present invention, for these (co)polymers to be modified with aromatic constituents, i.e., for aromatic constituents to be contained in the polymer. In one embodiment, it is possible to use aromatically substituted olefins, i.e. directly aromatically substituted monomers are used in the polymerization reaction. These can be, for example, vinyl-aromatic monomers such as styrene, or styrene derivatives that are substituted in the ring and have linear or branched alkyl substituents such as α-methylstyrene, p-tert.-butylmethylstyrene, 1,3-dimethylstyrene, or alkoxylated styrene derivatives. A preferred embodiment uses styrene as a monomer for polymerization. Propylene is preferred as a basic monomer.

In a further embodiment, the homo- or copolymers are modified after polymerization. To that end, these (co)polymers are reacted, using known methods, with radical initiators and with olefinically unsaturated, aromatically substituted compounds in a graft reaction. These compounds are preferably the aromatically unsaturated ones already mentioned above, such as styrene, α-methylstyrene, or alkyl-substituted styrene derivatives.

The aromatically modified (co)polymers thus obtained have a molecular weight from 1000 to 100,000 g/mol, in particular from 1000 to 50,000, particularly preferably up to 25,000 g/mol (molecular weight as arithmetic mean ($M_N$) determined with the GPC method). The aromatic monomer content is intended to be in the range from 1 to 20 mol %, based on the monomers. The viscosity is 50 to 2000 mPas, preferably 100 to 1000 mPas, in particular less than 500 mPas, at 170° C.; particularly preferably, the viscosity is between 100 and 1000 mPas at 140° C. (viscosity measured with Brookfield Thermosel, no. 27 spindle, at the temperature indicated). The softening point of the polymers is intended to be below 200° C., in particular below 160° C. According to the present invention, the polymers are used in a quantity from approximately 1 to 40 wt %.

Contained as further constituents of the hot-melt adhesive according to the present invention are 5-80 wt % of a further polyolefin based on ethylene and/or propylene, together with $C_4$ to $C_{20}$ α-olefins. These polyolefins are manufactured by metallocene catalysis. These are often amorphous atactic polyolefins. The polymers can be the same as those that were described as the basic polymers for the aromatically modified polymers. In this case, however, the polymers are not aromatically modified, i.e., they are not intended to contain aromatic constituents. An embodiment of the invention utilizes such co- or terpolymers based on $C_2/C_4$ to $C_{20}$ α-olefins. Another embodiment utilizes $C_3/C_4$ to $C_{20}$ α-olefins. The molecular weight of these polymers is usually below 200,000 g/mol, in particular below 100,000 g/mol, very particularly preferably below 30,000 g/mol. The lower limit is 1000 g/mol, preferably 1500 g/mol. The melt index of these polymers is intended to be greater than 5 g/10 min, preferably more than 30 g/10 min, in particular above 100 g/10 min (melt index measured at 190° C. and 2.16 kg).

These polymers are known in the literature and can be obtained commercially from various manufacturers. The aromatically modified homo- or copolymers and/or the unmodified polyolefin can in each case be one polymer, but it is also possible to use a mixture of up to three polymers for each constituent.

As an additional optional constituent, the hot-melt adhesive according to the present invention can contain 0-40 wt % of further polymers. These polymers can improve various applications-engineering properties of the hot-melt adhesive, e.g., cohesion, heat resistance, low-temperature flexibility, open time, and in particular the adhesive strength of the applied adhesive. These polymers are by preference compatible with the aromatically modified copolymers; in particular, they are intended to be compatible with a styrene component (which may optionally be present) of the modified copolymer. These further polymers are intended not to comprise any groups that crosslink under manufacturing and storage conditions.

These polymers can be, for example, rubber-like block copolymers that contain styrene and are constructed in linear or radial fashion, such as SIS, SBS, SIBS, and by preference SEBS and SEPS. Further examples are polybutene or its copolymers, polymethylvinyl ether and similar polymers, as well as polyphenylene oxide and modifications thereof. These additional polymers are intended to be solid at room temperature, and to be capable of mixing homogeneously with the hot-melt adhesive. A microphase structure is not precluded in this context.

If applicable, the further polymers can be functionalized, for example by grafting. Dicarboxylic acids and their anhydrides represent a preferred grafting agent.

As a further constituent, the hot-melt adhesive according to the present invention contains at least one tackifying resin. The resin produces additional tackiness, and improves the mutual compatibility of the hot-melt adhesive components. It is used in a quantity from 5 to 60 wt %, preferably 10 to 50 wt %. These are, in particular, resins that possess a softening point from 70 to 140° C. (ASTM method E28-58T). These are, for example, aromatic, aliphatic, or cycloaliphatic hydrocarbon resins, as well as modified or hydrogenated derivatives. Resins of this kind usable in the context of the invention are, for example, terpene resins such as terpolymers or copolymers of terpene, modified natural resins such as resin acids from balsam resin, tall rosin, or wood rosin, if applicable also hydroabietyl alcohol and its esters, acrylic acid copolymers such as styrene/acrylic acid copolymers, and resins based on functional hydrocarbon resins. It is preferred to use partially polymerized tall rosin, hydrogenated hydrocarbon resin, and colophon resin.

The hot-melt adhesives according to the present invention can, in addition to the aforesaid constituents, also contain further constituents usually introduced into hot-melt adhesives as additives. These include, for example, plasticizers, stabilizers, waxes, adhesion promoters, and antioxidants. With these, certain applications-engineering properties such as, for example, cohesive strength, viscosity, and softening point can be influenced. Fillers can furthermore be used in order to enhance strength and, if applicable, to reduce costs.

If applicable, waxes can be added to the hot-melt adhesive in quantities from 0 to 40 wt %, preferably 5 to approximately 25 wt %. The quantity is adjusted in this context so that on the one hand the viscosity is lowered to the desired range, but on the other hand adhesion is not negatively influenced. The wax can be of natural origin, optionally also in chemically modified form, or of synthetic origin. As natural waxes, vegetable waxes or animal waxes can be used, or mineral waxes or petrochemical waxes. Hard waxes such as montan ester waxes, sarsol waxes, etc. can be used as chemically modified waxes. Polyalkylene waxes and polyethylene glycol waxes are utilized as synthetic waxes. By preference, petrochemical waxes such as petrolatum, paraffin waxes, microcrystalline waxes, and synthetic waxes are used.

Plasticizers are utilized by preference in order to adjust the viscosity or flexibility, and are contained in the hot-melt adhesive according to the present invention generally at a concentration from 0 to 20 wt %, by preference in a concentration from 1 to 10 wt %. Suitable plasticizers are medicinal white mineral oils, naphthenic mineral oils, polypropylene, polybutene, and polyisoprene oligomers, hydrogenated polyisoprene and/or polybutadiene oligomers, benzoate esters, phthalates, adipates, vegetable or animal oils and derivatives thereof. Hydrogenated plasticizers are selected, for example, from the group of the paraffinic hydrocarbon oils. Polypropylene glycol and polybutylene glycol, as well as polymethylene glycol, are also suitable. If applicable, esters are also used as plasticizers, e.g., liquid polyesters and glycerol esters, or plasticizers based on aromatic dicarboxylic acid esters. Alkyl monoamines and fatty acids having, by preference, 8 to 36 C atoms can likewise be suitable.

The purpose of the stabilizers is to protect the adhesive composition from decomposition during processing. To be mentioned here in particular are the antioxidants or also light-protection agents. They are added to the hot-melt adhesive usually in quantities of up to 3 wt %, by preference in quantities from approximately 0.1 to 1.0 wt %.

Further additives can also be incorporated into the hot-melt adhesive in order to vary certain properties. These can be, for example, dyes, or fillers such as titanium dioxide, talc, clay, or the like.

The hot-melt adhesive according to the present invention can furthermore contain adhesion promoters. Adhesion promoters are substances that improve the adhesion of the hot-melt adhesive to the substrate being bonded. Adhesion promoters are intended in particular to improve the aging behavior of adhesive bonds under the influence of a humid atmosphere. Typical adhesion promoters are, for example, ethylene/acrylamide comonomers, polymeric isocyanates, reactive silicon-organic compounds, or phosphorus derivatives. The wetting properties of the adhesive, and thus the capability for adhesion to substrates, can likewise be influenced.

The additives, such as plasticizers, stabilizers, or adhesion promoters, are known to one skilled in the art. They are commercial products, and one skilled in the art can select them in accordance with desired properties. Care must be taken in this context that compatibility with the polymer mixture exists.

The hot-melt adhesive according to the present invention is generally manufactured by mixing. All the components can be simultaneously provided, heated, and then homogenized; or firstly the more easily melted components are provided and mixed, then the further resin constituents are added, and finally further additives, which in some cases are sensitive to elevated temperature, are added. It is also possible to manufacture the hot-melt adhesive continuously in an extruder. After filling or portioning of the completely homogenized mixture, it is left to cool, whereupon it solidifies. The hot-melt adhesive according to the present invention has a solid consistency and (aside from contaminants) is free of solvents. It is homogeneous, and no separation of the polymer constituents may be observed even when melted. Methods for manufacturing, filling, and packaging hot-melt adhesives according to the present invention are known to one skilled in the art.

The application method depends on the type of substrate to be adhesively bonded and the machines suitable therefor. This can involve single-point application, large-area application, or application in strip form. Application can be accomplished via spray-nozzle application, by extrusion coating, or with the use of roller application system.

The hot-melt adhesives according to the present invention have a viscosity that is coordinated with the usual application methods. The hot-melt adhesives possess a viscosity from 100 to 30,000 mPas, by preference 400 to 20,000 mPas, in particular 500 to 5000 mPas, at a temperature of 160° C. (viscosity measured with a Brookfield Thermosel, no. 27 spindle, at the temperature indicated).

In the context of utilization, it is advisable to use a hot-melt adhesive having the lowest possible viscosity at the application temperature. This ensures better applicability and makes the hot-melt adhesive easier to deliver. Wetting of the substrate is likewise promoted thereby. After application onto a substrate surface, the side of the hot-melt adhesive facing the air must remain tacky and adhesive for as long as possible. This "open time" depends on the melt behavior and crystallization behavior of the hot-melt adhesive. Selection of the polymer components to be used according to the present invention, made up of aromatically modified polyolefin homo- or copolymers in combination with olefin polymers that are not aromatically modified, yields a long open time; in other words, bonding to the second substrate surface is possible even after a longer period of time. Once both substrates have been pressed onto the hot-melt adhesive, a relatively short curing time for the hot-melt adhesive is achieved. During this time span, the adhesive bond builds up between the two substrate surfaces.

The hot-melt adhesives according to the present invention are utilized for adhesive bonding of substrates such as unvarnished or coated paper or corresponding boards, films, plastics, or glass, and for other applications. Multi-layer films, or containers such as folding boxes, outer cartons, trays, can be manufactured therewith. The hot-melt adhesives according to the present invention are notable in particular for very good adhesion to the aforesaid substrates. Particular suitability exists for adhesive bonds that are exposed to low temperatures during storage. The surfaces adhesively bonded in this fashion remain flexible even at low temperature. In addition, the adhesive bonds made with the adhesive according to the present invention exhibit good bond strength even when stored at low or elevated temperatures, without losing flexibility, cracking, or exhibiting a detectable loss of cohesion.

The present invention will be further explained below by means of examples.

EXAMPLES

Example 1

| 50 parts | Ethylene/1-octene copolymer | (AFFINITY GA 1900) |
| 20 parts | Tack resin, hydrocarbon resin | (ARKON M 100) |
| 20 parts | Paraffin wax | (SASOL Wax 6703) |
| 10 parts | Styrene-modified polyolefin resin | (LICOCENE PE ST 4361) |

Example 2

| 50 parts | Propylene/ethylene copolymer | (LICOCENE 1502) |
| 20 parts | Tack resin, hydrocarbon resin | (ARKON M 100) |
| 12 parts | Propylene copolymer wax | (LICOCENE 1302) |
| 10 parts | Styrene-modified polyolefin resin | (LICOCENE PE ST 4361) |
| 8 parts | Styrene block copolymer | (KRATON G 1657) |

Example 3 (Comparison)

| 50 parts | Ethylene/1-octene copolymer | (AFFINITY GA 1900) |
| 20 parts | Tack resin, hydrocarbon resin | (ARKON M 100) |
| 10 parts | Paraffin wax | (PARAFLINT H1) |
| 20 parts | Paraffin wax | (SASOL Wax 6703) |

Example 4 (Comparison)

| 50 parts | Ethylene/1-octene copolymer | (AFFINITY GA 1900) |
| 20 parts | Tack resin, hydrocarbon resin | (ARKON M 100) |
| 10 parts | Paraffin wax | (SASOL Wax 6703) |
| 20 parts | Paraffin wax | (PARAFLINT H1) |

Method

Constituents 1-4 were mixed in an ordinary commercial laboratory stirring unit at 160° C. and stirred until they were homogeneous. They were then filled into suitable vessels for cooling.

Results:

|  | Example 1 | Example 2 | Example 3 | Example 4 |
| --- | --- | --- | --- | --- |
| Viscosity [mPas] | 1170 | 1700 | 1180 | 1120 |
| Open time [sec] | 15 | 15 | 15 | 6 |
| Curing time [sec] | 3 | 5 | 8 | 3 |
| Adhesion (25° C.) | + | ++ | + | − |
| Adhesion (−10° C.) | + | ++ | − | − |

Test methods:

Viscosity: 160° C.; Brookfield Thermosel, no. 27 spindle

Open time: Strips of adhesive were applied at 170° C. with a doctor blade, and were covered at successive time intervals with paper strips and light pressure. These were pulled off to determine the time after which adhesion was no longer possible.

Setting Time: Inatec Adhesion Testing Instrument

At a specific application temperature, a defined quantity of adhesive was applied and was covered with a second substrate after a specific amount of time (less than the open time). After different time spans, the specimen was pulled off and the tensile force measured. The setting time is the time at which the maximum adhesion force was measured.

Adhesion: −Adhesive Failure+Fiber Breakage++Intensive Fiber Breakage

Under defined conditions, two strips of KRAFTLINER corrugated paperboard were adhesively bonded to one another and stored for two days. The specimens were then held for three hours at measurement temperature and then tested by being pulled apart.

The hot-melt adhesive according to the present invention yields a long open time together with a short curing time. The adhesive strength is improved, especially at low temperature.

What is claimed is:

1. A hot-melt adhesive comprising:
   1 to 40 wt % of at least one modified homo- or copolymer based on ethylene and/or propylene, which has been modified with aromatic constituents obtained by grafting one or more α, β-unsaturated aromatically substituted monomers onto a homo- or copolymer,
   wherein the at least one modified homo- or copolymer has a viscosity of less than 1000 mPas at 170° C. (measured by Brookfield Thermosel, no. 27 spindle);
   5 to 80 wt % of at least one further olefin copolymer, not aromatically modified and based on ethylene and/or propylene and $C_4$ to $C_{20}$ α-olefins, that is obtained by metallocene-catalyzed polymerization; and
   5 to 60 wt % of at least one tackifying resin.

2. The hot-melt adhesive according to claim 1, wherein the modified homo- or copolymer is obtained by modifying a homo- or copolymer produced by metallocene-catalyzed polymerization and selected from the group consisting of ethylene hompolymers, propylene homopolymers and ethylene and/or propylene/$C_4$ to $C_{20}$ α-olefin copolymers.

3. The hot-melt adhesive according to claim 1, wherein the aromatically substituted monomer is styrene or a substituted styrene derivative.

4. The hot-melt adhesive according to claim 1, wherein the modified homopolymer or copolymer has a molecular weight ($M_n$) from 1000 to 50,000 g/mol.

5. The hot-melt adhesive according to claim 1, wherein the further olefin copolymer has a molecular weight ($M_n$) from 1500 to 100,000 g/mol.

6. The hot-melt adhesive according to claim 5, wherein the further olefin copolymer is a propylene/$C_4$ to $C_{12}$ α-olefin copolymer or an ethylene/$C_3$ to $C_{12}$ α-olefin copolymer.

7. The hot-melt adhesive according to claim 1, additionally comprising one or more polymers selected from the group consisting of block copolymers, polyphenylene oxide, polymethylvinyl ether, and polybutene.

8. The hot-melt adhesive according to claim 7, wherein the one or more polymers are styrene-containing block copolymers.

9. The hot-melt adhesive according to claim 7, wherein the one or more polymers are functionalized by grafting.

10. The hot-melt adhesive according to claim 1, additionally comprising 5 to 25% of at least one wax.

11. The hot-melt adhesive according to claim 1, wherein the modified homopolymer or copolymer has a softening point below 160° C.

12. The hot-melt adhesive according to claim 1, wherein the modified homo- or copolymer has an aromatic monomer content in the range from 1 to 20 mol %.

13. The hot-melt adhesive according to claim 1, wherein the at least one further olefin copolymer is selected from the group consisting of ethylene/1-octene copolymers and propylene/ethylene copolymers.

14. A hot-melt adhesive comprising:

1 to 40 wt % of at least one modified homo- or copolymer based on ethylene and/or propylene, which has been modified with aromatic constituents having a molecular weight ($M_n$) from 1000 to 50,000 g/mol and which has an aromatic monomer content in the range from 1 to 20 mol %;

5 to 80 wt % of at least one further olefin copolymer, not aromatically modified and based on ethylene and/or propylene and $C_4$ to $C_{20}$ α-olefins, that is obtained by metallocene-catalyzed polymerization and has a melt index more than 30 g/10 min (measured at 190°C. and 2.16 kg);

5 to 60 wt % of at least one tackifying resin; and 5 to 25 wt % of at least one wax.

15. The hot-melt adhesive according to claim 14, additionally comprising at least one styrene-containing block copolymer.

16. A method of adhesive bonding a package or paperboard product using an adhesive, said method comprising using a hot-melt adhesive according to claim 1 as the adhesive.

* * * * *